(No Model.)
J. F. HARVEY.
MILK COOLER.
No. 581,070. Patented Apr. 20, 1897.
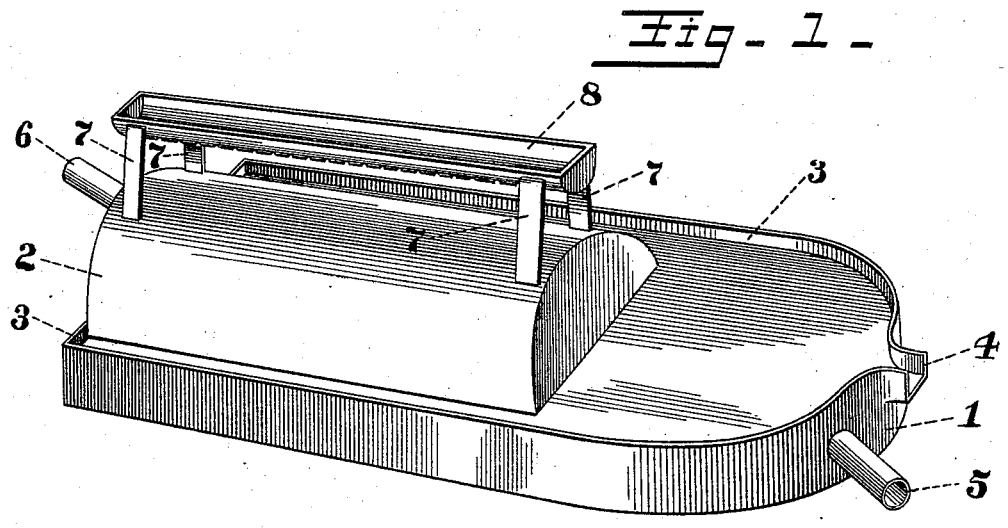
*Fig. 1.*
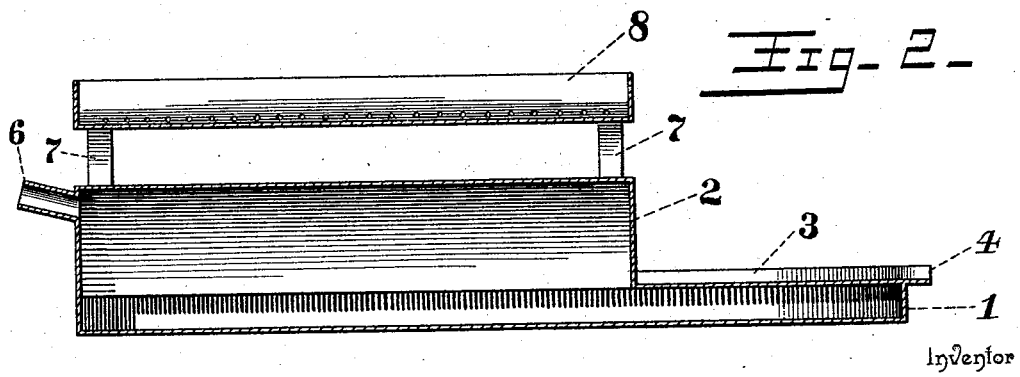
*Fig. 2.*
Witnesses
S. Kind.
Inventor
James F. Harvey
By His Attorneys,
THE NORRIS PETERS CO., PHOTO-LITHO., WASHINGTON, D. C.

UNITED STATES PATENT OFFICE.

JAMES F. HARVEY, OF CHRISTIANA, PENNSYLVANIA.

MILK-COOLER.

SPECIFICATION forming part of Letters Patent No. 581,070, dated April 20, 1897.

Application filed August 21, 1895. Serial No. 560,076. (No model.)

*To all whom it may concern:*

Be it known that I, JAMES F. HARVEY, a citizen of the United States, residing at Christiana, in the county of Lancaster and State of Pennsylvania, have invented a new and useful Milk-Cooler, of which the following is a specification.

My invention relates to milk-cooling apparatus, and the object in view is to provide a simple, inexpensive, and efficient device constructed and adapted to cool milk and cream solely by the use of circulating water, the cooler being adapted to be placed beneath to receive the cream directly from an ordinary separator, such as those employed in creameries.

Further objects and advantages of this invention will appear in the following description, and the novel features thereof will be particularly pointed out in the appended claim.

In the drawings, Figure 1 is a perspective view of a cooler constructed in accordance with my invention. Fig. 2 is a longitudinal section of the same.

Similar numerals of reference indicate corresponding parts in both figures of the drawings.

1 designates a flat hollow base forming a receptacle for a cooling agent and provided with a communicating semicylindrical extension forming an arched or domed milk-shed 2, arranged horizontally and spaced from the side edges of the base to produce side gutters. An upstanding flange 3 is formed around the side and front edges of the base to provide a pan or trough for the reception of the milk or cream, and communicating with this trough is an outlet-spout 4. Communicating with the interior of the base is an inlet-tube 5, and communicating with the domed extension is an outlet-tube 6, whereby water or other cooling agent introduced through the inlet-opening is allowed to rise and flow out through the outlet-opening to maintain the upper surface of the base and domed extension at the proper cooling temperature.

Arranged horizontally above the center of the dome or arch and parallel therewith, the same being supported upon standards 7, is a distributing-trough 8 for the reception of the cream or milk, said distributing-trough being provided in its bottom with perforations through which the milk drops to the surface of the dome or arch. After descending over the surface of the dome or arch, during which operation it is aerated, the milk or cream is received by the gutters formed at the sides of the shed 2 and the upper surface of the base and conveyed thereby to the outlet-spout 4.

While in the above description I have referred to the utility of the improved device in connection with cooling cream, it will be understood that it may be used with equal facility and advantage with milk and any other similar liquid, and by applying the liquid first to the convex surface of the dome in small streams it is thoroughly aerated, the entire cooling operation being accomplished by means of water or its equivalent.

By arranging the water-inlet contiguous to the spout 4 and the outlet at the upper end of the extension the milk or other liquid as it approaches the spout traverses a surface of gradually-lowering temperature.

From the above description it will be seen that the floor of the milk-receptacle has a flat unbroken surface except at the end opposite to the outlet 4, where it is domed to form an upwardly-convexed surface upon which the milk is deposited. This domed surface has the effect of spreading the milk to form a thin film for aeration. After the milk leaves the domed portion it spreads upon the surface of the floor of the receptacle and passes without obstruction to the outlet-opening. The water-chamber, which is located below the floor of the milk-receptacle, is flat in order to hold the contents of said chamber in contact with the under surface of the floor of the milk-receptacle, and is shallow to enable it to be filled by a smaller quantity of the cooling agent and thereby insure a continued circulation and hence a continued change of the cooling agent. Thus it will be seen that the milk is deposited upon a portion of the surface of the cooling apparatus which is of considerably higher temperature than that to which it is desired to reduce it, and as the milk traverses the surface toward the outlet-spout it gradually approaches the inlet-passage for the cooling agent and thus comes in contact with a progressively lower temperature of surface, the milk remaining in a thin layer or film throughout its passage from the distributing-trough to the point of escape at the outlet-spout.

Having described my invention, what I claim is—

A milk-cooler comprising a hollow water-circulating base having a peripheral flange and a main flat top portion forming a milk-circulating pan, said flange being extended at one end of the base into a delivery-spout 4, a hollow semicylindrical milk-shed 2 arising from the flat top of the base longitudinally thereof and having its interior in direct communication with the interior of the base, said shed extending from one end of the base to an intermediate point and of a narrower width than the base, whereby the transversely-arched top of the shed will meet the flat top of the base at a point away from the side portions of the peripheral flange to produce gutters at the sides of the shed, a milk-distributing trough 8 supported in a fixed position longitudinally above the peak or uppermost point of the milk-shed and provided in its bottom with perforations, an inlet-tube communicating with the interior of the base near the delivery-spout 4, and an outlet-tube opening into one end of the milk-shed 2 contiguous to the peak of the arched top portion of the shed, substantially as set forth.

In testimony that I claim the foregoing as my own I have hereto affixed my signature in the presence of two witnesses.

JAMES F. HARVEY.

Witnesses:
J. A. HARRAR,
J. D. HARRAR.